Feb. 2, 1960     K. P. WIEDERKEHR     2,923,905

TRANSFORMER TANK SHIELD

Filed Aug. 5, 1957

Inventor
Karl P. Wiederkehr
By Robert B. Benson
Attorney

United States Patent Office 2,923,905
Patented Feb. 2, 1960

2,923,905

TRANSFORMER TANK SHIELD

Karl P. Wiederkehr, Elm Grove, Wis., assignor to Allis-Chalmers Manufacturing Company, Milwaukee, Wis.

Application August 5, 1957, Serial No. 676,315

7 Claims. (Cl. 336—84)

This invention relates generally to a magnetic shield for stationary induction apparatus. More specifically this invention relates to a novel assembly of lamination stacks to form a magnetic shield for controlling leakage flux in a transformer.

Leakage flux is a serious problem in large stationary induction apparatus such as power transformers which are designed to carry heavy current loads. Such apparatus may be designed to take advantage of the leakage flux to limit undesirable fault currents. However, even though the leakage flux in such apparatus may be acceptable from the standpoint of economy and operation under certain conditions, the stray flux may be sufficient to cause excessive eddy current and hysteresis heating of the apparatus tank wall and other structural parts. Therefore it is desirable in many applications to control or eliminate the heating effect of the leakage flux.

One way of controlling the heating effect of the leakage flux in the tank wall is to place a conductive shield between the winding and the wall. The eddy currents formed in the shield by the leakage flux create a counter-flux which opposes the leakage flux of the windings thereby reducing the total amount of flux in the tank wall.

Another method of controlling the heating effect of the leakage flux in the tank wall is to divert the flux from the tank wall through a low reluctance path of laminated core material mounted between the wall and the windings. The flux in the laminations sets up eddy currents in the laminations. However, the heating of a thin conductor such as a lamination by eddy currents is proportional to the square of the thickness of the lamination. Therefore the heating of the thin laminations by eddy currents is insignificant and does not present a heating problem.

This invention contemplates controlling the heating effect of the leakage flux in a stationary induction apparatus by directing the leakage flux through a tank shield made up of a plurality of spaced stacks of laminations. The spaces between the stacks of laminations have a considerably higher reluctance than the stacks. Therefore the majority of the flux will be directed through the stacks of laminations. It is not necessary to prevent all flux from entering the tank wall but only to reduce the amount of flux entering the tank wall so that the heating created by the flux in the tank wall is of such a magnitude that it can be easily dissipated by the wall surfaces.

Since heating by the eddy currents depends greatly upon the thickness of the conductor, it is desirable to separate adjacent laminations from each other to prevent the laminations from combining to form a single conductor. Therefore each lamination is provided with a thin insulating coating. The flat sides of the laminations are in contact with adjacent laminations and are not likely to be shorted. However, the edges of the laminations are apt to come in contact with mounting clamps used in assembling the shield which will short the stack of laminations. Therefore the clamps holding the stacks of laminations on the mounting plate should be electrically insulated from the laminations. Furthermore the stacks of laminations should be grounded to prevent the building up of a charge between the tank and the shield which would cause corona.

One known method in the prior art for assembling such a magnetic shield is to wrap the stacks of laminations in fullerboard insulation and attach the stacks to the apparatus tank wall by a number of clips which were welded to the tank wall and bent over the edge of the stack to form an L-shaped clamp. The stacks of laminations were grounded by running a lead from the stack around the insulation to the tank wall. In this type of a shield, each stack of laminations had to be individually mounted on the transformer tank wall prior to assembly of the transformer which was a cumbersome and inefficient process.

The magnetic shield of this invention overcomes the disadvantages of the shield described above by calling for preassembled stacks of laminations attached to a mounting plate by novel insulated mounting supports. The stacks of laminations can be assembled on the mounting plate prior to positioning the shield within the apparatus tank. In the shield of this invention the insulation is applied to the supports rather than to the laminations thereby making it easier to apply the insulation and run the ground between the stacks of laminations and the tank wall. Furthermore, the entire shield can be assembled outside the tank and then mounted on the tank wall. This is a much simpler and easier method of assembly than to try to mount each individual stack of laminations directly to the tank wall.

Therefore it is an object of this invention to provide a new and improved magnetic shield for use with stationary induction apparatus.

Another object of this invention is to provide a new and improved magnetic tank shield for transformers that is more reliable and easier to assemble.

Other objects and advantages of this invention will be apparent from reading the following description in connection with the accompanying drawings in which.

Figure 1:
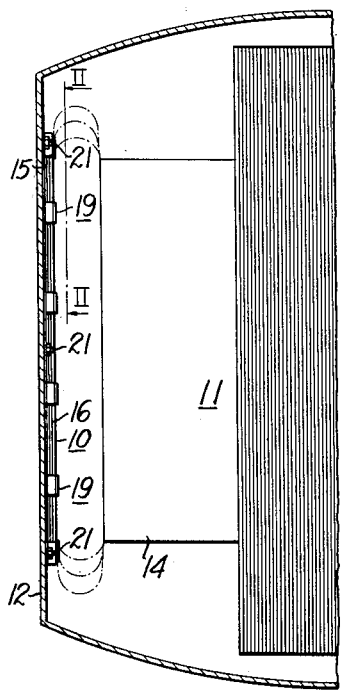
Fig. 1 is a top view of a magnetic shield of this invention mounted between the tank wall and the winding of a transformer and having the tank wall broken away.
Figure 2:
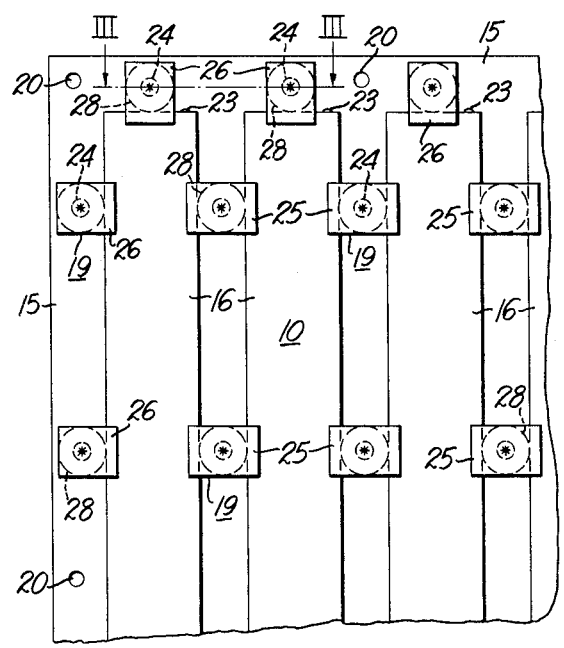
Fig. 2 is a front view of the magnetic shield of this invention taken along the line II—II of Fig. 1.
Figure 3:
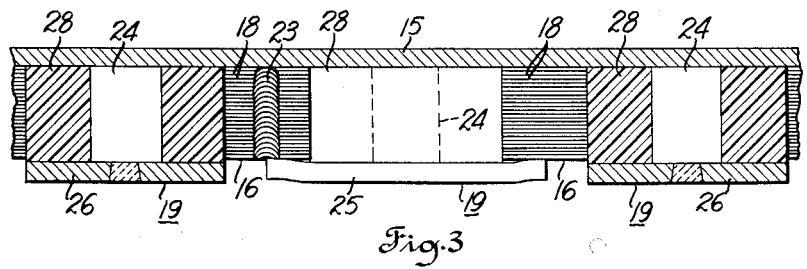
Fig. 3 is an enlarged view of the shield of Fig. 2 taken along the line III—III.

The magnetic shield 10 of this invention is illustrated in the drawing in connection with a transformer 11. The shield 10 is positioned intermediate the transformer tank wall 12 and the winding 14 of the transformer 11. The shield 10 comprises a mounting plate 15, a plurality of stacks 16 of magnetic laminations 18 and supports 19 for mounting the stacks 16 on the mounting plate 15.

The mounting plate 15 may be made of magnetic or nonmagnetic material and is provided with bolt holes 20 for attaching the shield 10 to the tank wall of the transformer. The plate may be mounted on the tank wall in any suitable way but preferably it is removably mounted through the use of means such as bolts 21. The plate 15 is designed to be mounted on a transformer tank wall so that the stacks of laminations run parallel to the magnetic axis of the windings. Since the flux density is highest nearest the windings, heating usually occurs only in the area in which the windings are nearest the tank walls. Therefore, the tank is provided with a number of shields positioned on the walls in the areas nearest the windings.

The stacks 16 are made up of a plurality of thin elongated strips 18 of core material. The strips are insulated from one another by any suitable means. Usually the strips are coated with an insulating compound. Each stack 16 is made up separately and a weld 23 runs across the edge of each stack at one place only to provide an electrical connection between the individual laminations. The weld is extended to the plate 15 which is in turn mounted on a transformer wall 12 to extend the electrical connection from the stacks to the transformer tank to form a ground for the stacks 16 of laminations.

The stacks 16 are positioned on the plate 15 and then mounted on the plate by means of supports 19. The supports are made up of studs 24 attached to the plate 15 in predetermined positions at the ends and along the sides of the stacks and locking strips 25, 26 which are attached to the studs and extend over the stacks of laminations to secure the stacks to the plate. The studs 24 are surrounded with suitable insulation to form a mechanical support for the edges of the stacks and to prevent the shorting of stacked laminations through the studs. Preferably the insulation is in the form of washers or sleeves 28 to facilitate assembly of the shield. The studs 24 and washers 28 are preferably the same height as the stacks 16 of laminations. The locking strips 25, 26 are positioned on the studs 24 to extend over the stacks and then spot welded to the studs to hold the stacks on the plate 15.

The studs 24 which are positioned intermediate adjacent stacks 16 of laminations are provided with locking strips 25 which extend over both of the adjacent stacks of laminations. The studs which are at either end of a stack of laminations or adjacent the outboard side of the end stacks are provided with a locking strip 26 which extends only over the single adjacent stack of laminations.

After the stacks of laminations are mounted on the mounting plate, the entire shield assembly is mounted in the transformer tank.

Although but one embodiment has been illustrated and described, it will be apparent to those skilled in the art that various changes and modifications may be made herein without departing from the spirit of the invention and the scope of the appended claims.

What is claimed is:

1. A magnetic tank shield for transformers comprising a mounting plate, a plurality of spaced stacks of laminations of magnetic material on said plate, supports for mounting said stacks on said plate, said supports comprising studs mounted on said plates adjacent said stacks, insulation positioned intermediate said studs and said stacks, and locking strips attached to said studs and extending over said stacks to mount said stacks on said plate, said stacks being electrically connected to said plate for grounding.

2. A magnetic tank shield for transformers comprising a mounting plate, a plurality of spaced stacks of laminations of magnetic material positioned on said plate, and supports for mounting said stacks on said plate, said supports comprising studs mounted on said plate and positioned near said stacks, insulation surrounding said studs, and locking strips attached to said studs and extending over said stacks to mount said stacks on said plate.

3. A magnetic tank shield for transformers comprising a mounting plate, a plurality of spaced stacks of laminations of magnetic material positioned on said plate, and supports for mounting said stacks on said plate, said supports comprising studs mounted on said plates and positioned adjacent said stacks, insulating sleeves surrounding said studs and extending to the top of said stacks, and locking strips abutting said sleeves and attached to said studs, said strips extending over said stacks to mount said stacks on said plate.

4. A magnetic tank shield for transformers comprising a mounting plate, a plurality of spaced stacks of longitudinally extending laminations of magnetic material on said plate, said stacks being substantially parallel and positionable parallel to the axis of the trnsformer coils, and supports for mounting said stacks on said plate, said supports comprising studs mounted on said plates and positioned at both ends and along the sides of said stacks, insulation sleeves surounding said studs, and locking strips attached to said studs and extending over said stacks to mount said stacks on said plate, said stacks being electrically connected to said plate for grounding.

5. A transformer comprising a tank, a core and coil assembly positioned in said tank, and a magnetic tank shield mounted on the wall of said tank adjacent said coil, said tank shield comprising a plate attached to said tank wall, a plurality of spaced stacks of laminations of magnetic material positioned on said plate, and supports for mounting said stacks on said plate, said supports comprising studs mounted on said plate and positioned near said stacks, insulation sleeves surrounding said studs, and locking strips attached to said studs and extending over said stacks to mount said stacks on said plate.

6. A transformer comprising a tank, a core and coil assembly positioned in said tank, and a magnetic tank shield removably mounted on said tank wall adjacent said coil, said tank shield comprising a plate attached to said tank wall, a plurality of spaced stacks of longitudinally extending laminations of magnetic material positioned on said plate, and supports for mounting said stacks on said plate, said stacks being positioned substantially parallel to the magnetic axis of said transformer coil and connected electrically to said plate for grounding, said supports comprising studs mounted on said plate and positioned near said stacks, insulation sleeves surrounding said studs, and locking strips attached to said studs and extending over said stacks to mount said stacks on said plate.

7. A magnetic tank shield for transformers comprising a mounting plate, a plurality of spaced stacks of laminations of magnetic material on said plate, supports positioned adjacent the edges of said laminations, for mounting said stacks on said plate and insulation mounted on said supports individually to prevent said supports from short circuiting said laminations, said stacks electrically connected to said plate for grounding.

References Cited in the file of this patent

UNITED STATES PATENTS

| 1,394,910 | Kiersted | Oct. 25, 1921 |
| 1,723,000 | Austin | Aug. 6, 1929 |
| 2,223,737 | Moses | Dec. 3, 1940 |
| 2,340,081 | Sauer | Jan. 25, 1944 |